(12) United States Patent
Su et al.

(10) Patent No.: US 11,573,628 B2
(45) Date of Patent: Feb. 7, 2023

(54) SMART MAT

(71) Applicant: CERADEX CORPORATION, Taoyuan (TW)

(72) Inventors: Chen-Yuan Su, Taoyuan (TW); Liang-Tai Tsai, Taoyuan (TW); Wei-Lun Huang, Taoyuan (TW)

(73) Assignee: CERADEX CORPORATION, Taoyuan (TW)

( * ) Notice: Subject to any disclaimer, the term of this patent is extended or adjusted under 35 U.S.C. 154(b) by 0 days.

(21) Appl. No.: 17/458,567

(22) Filed: Aug. 27, 2021

(65) Prior Publication Data

US 2022/0075446 A1 Mar. 10, 2022

(30) Foreign Application Priority Data

Sep. 4, 2020 (TW) ................. 109130440

(51) Int. Cl.
| | |
|---|---|
| *G06F 3/01* | (2006.01) |
| *G06K 9/00* | (2022.01) |
| *B32B 7/12* | (2006.01) |
| *B32B 5/12* | (2006.01) |
| *H04W 4/80* | (2018.01) |

(52) U.S. Cl.
CPC ............... *G06F 3/011* (2013.01); *B32B 5/12* (2013.01); *B32B 7/12* (2013.01); *G06K 9/0057* (2013.01); *G06K 9/00523* (2013.01); *H04W 4/80* (2018.02); *B32B 2250/03* (2013.01)

(58) Field of Classification Search
CPC ....................................................... G06F 3/011
See application file for complete search history.

(56) References Cited

U.S. PATENT DOCUMENTS

| 2013/0021136 A1* | 1/2013 | Brunetti ................... G07C 9/15 340/5.7 |
| 2013/0025955 A1* | 1/2013 | Chavand ................ A63C 17/12 180/181 |

FOREIGN PATENT DOCUMENTS

TW M570448 11/2018

* cited by examiner

*Primary Examiner* — Nan-Ying Yang
(74) *Attorney, Agent, or Firm* — Fei-hung Yang

(57) ABSTRACT

A smart mat includes a stepping potential generation unit, a computing processor and a transmission processor for sensing the stepping direction of a stepper to control the operation of a device. The stepping potential generation unit includes an upper mat, an isolating airgap layer, a lower mat and at least one high-resistance strips. When the stepper stands on the smart mat to press the stepping potential generation unit, a part of the stepping potential generation unit is pressed by an open-circuit state to form a closed circuit and generate a potential. The computing processor uses the distributed position of each potential and the time sequence of distributing each potential to compute and analyse a potential stepping process distribution area to obtain a stepping direction, so as to control the operation of the device through the transmission processor.

12 Claims, 15 Drawing Sheets

SMART MAT

CROSS-REFERENCE TO RELATED APPLICATIONS

This non-provisional application claims priority under 35 U.S.C. § 119(a) on Patent Application No(s). 109130440 filed in Taiwan, R.O.C. on Sep. 4, 2020, the entire contents of which are hereby incorporated by reference.

BACKGROUND

Technical Field

The present invention relates to potentiometer application systems, in particular to a smart mat that integrates the piezoresistive pressure sensor technology of film touch type potentiometer and the IoT control technology, so that a floor mat can drive a corresponding device to operate directly after sensing the stepping direction of an actor, and achieve the purpose of a smart and beautiful life and a comfortable and convenient living environment.

Description of Related Art

R.O.C. Pat. No. M570448 has disclosed an automatic door system with a floor mat sensing device, and this device uses a pressure sensing device to sense the pressure carried by a floor mat, and drives an automatic door to open when a stepper steps on the floor mat. Although the system above can overcome the drawbacks of using a push switch and an infrared light for sensing the automatic door, this system cannot judge the stepping direction of the stepper who may enter or exit through the door and can only execute the operation of opening the door. In this way, this system does not has the function of driving the automatic door to be opened or shut on the precise time and definitely fails to meet the service requirement of a smart device.

To overcome this problem, infrared is used, wherein two sets of infrared sensing elements are used to recognize the stepping direction, but this sensing method requires a long time use of power and thus consuming a large quantity of energy, which is not conducive to the development of eco-friendly technology of the current era. Therefore, it is a main subject for the present invention to find a way of using a position sensor to sense the position of the stepper by a film touch type potentiometer and then analysing and learning the stepping direction of the stepper, so that the automatic door not just can be opened automatically only, but also can be driven to be shut on the precise time, so as to overcome the aforementioned drawbacks of the prior art and achieve the purposes of realizing smart life and creating a beautiful living environment.

SUMMARY

Therefore, it is a primary objective of the present disclosure to provide a smart mat integrated with IoT to control a device of a building device, so that the movement of an actor can be sensed by a floor mat laid on the ground to control the operation of a building facility such as a door, a light or an air conditioner directly, so as to optimizing our living environment and improving the comfort of home.

To achieve the foregoing and other objectives, the present invention discloses a smart mat for sensing the stepping direction of a stepper to control the operation of a device, characterized in that the smart mat comprises a stepping potential generation unit, a computing processor, a transmission processor and a battery, the computing processor electrically coupled to the stepping potential generation unit, the transmission processor and the battery, and the stepping potential generation unit comprises an upper mat, an isolating airgap layer, a lower mat and at least one high-resistance strip, and the upper mat is made of a polymer material and printed with a plurality of conductive wire groups, and the lower mat is made of a polymer material and printed with a plurality of conductive films, and the high-resistance strip is disposed between the upper mat and the lower mat, so that when the stepper is standing at one of the positions of the upper mat and presses a part of the stepping potential generation unit, the part of the stepping potential generation unit is pressed by an open-circuit state to pass a part of the conductive wire groups through the isolating airgap layer and then touch the conductive film for an electrical conduction; a part of the conductive wire groups and a part of the conductive films are electrically contacted with the high-resistance strip to an extent of a length, wherein the longer the electrical contact length of the high-resistance strip, the larger the resistance and the smaller the potential, to generate a transition signal and a potential signal, and the transition signal is provided for waking up the computing processor, and the computing processor computes the distributed position of each potential and the time sequence of distributing each potential to obtain a potential stepping process distribution area, so as to obtain and analyze a stepping direction and transmit a computation result to the corresponding device through the transmission processor.

In addition, the computing processor analyses the potential stepping process distribution area to know that there is a small quantity of potentials determined as at least one small-area livestock stepping, a middle quantity of potentials determined as at least one middle-area child stepping, a large quantity of potential determined as at least one large-area adult stepping, and the largest quantity of potentials determined as at least one largest-area baby lying; the potential stepping process distribution area shows different modes including an area of the stepping or lying with a single potential distribution, an area of the stepping or lying of the large-area adult stepping with a plural quantity of potential distributions, and adjacent areas of the middle-area child stepping and the small-area livestock stepping, or the small-area livestock stepping surrounding the middle-area child stepping, and if the computing processor determines that the small-area livestock stepping surrounds the middle-area child stepping or the largest-area baby lying, an intermittent warning will be sent, and if the computing processor determines that the small-area livestock stepping surrounds the largest-area baby lying or the time sequence of the small-number potential distribution of the small-area livestock stepping densely surrounds the middle-area child stepping, a danger warning will be sent; and if the computing processor determines that the time sequence of the small-number potential distribution of the small-area livestock stepping densely surrounds the largest-area baby stepping, an extreme danger warning will be sent.

In summation, the smart mat can be used as a common floor mat in daily life directly to facilitate the sensor deployment of a smart system. In other words, the smart mat does not require additional manpower and cost to install the sensing element corresponding to the device in the surrounding environment to intelligently control the device, so that the smart mat can avoid damaging the decoration or causing a safety concern due to the installation of the sensing element, so as to achieve the effect of promoting the popularity of smart systems. In addition, the stepping potential generation unit has the characteristics of small thickness, high flexibility and bendability, free of push rod, infinite resistance when not touched, and resistance generated when touched and changing with the touch position. The smart mat not can just meet the practical requirements only, but also can actually sense the continuously changing movement position of the stepper, and thus allowing the computing processor to calculate and know the movement of the stepper to achieve the service requirements of the smart system. What is more, this invention can avoid touching the switch by hands to reduce contacts at the current point of the global outbreak of the COVID-19, and can control the ON/OFF timing of the device to ensure social distancing and control the number of people indoors.

DESCRIPTION OF THE EMBODIMENTS

The accompanying drawings are included to provide a further understanding of the disclosure, and are incorporated in and constitute a part of this specification. The drawings illustrate embodiments of the disclosure and, together with the description, serve to explain the principles of the disclosure.

Figure 1:
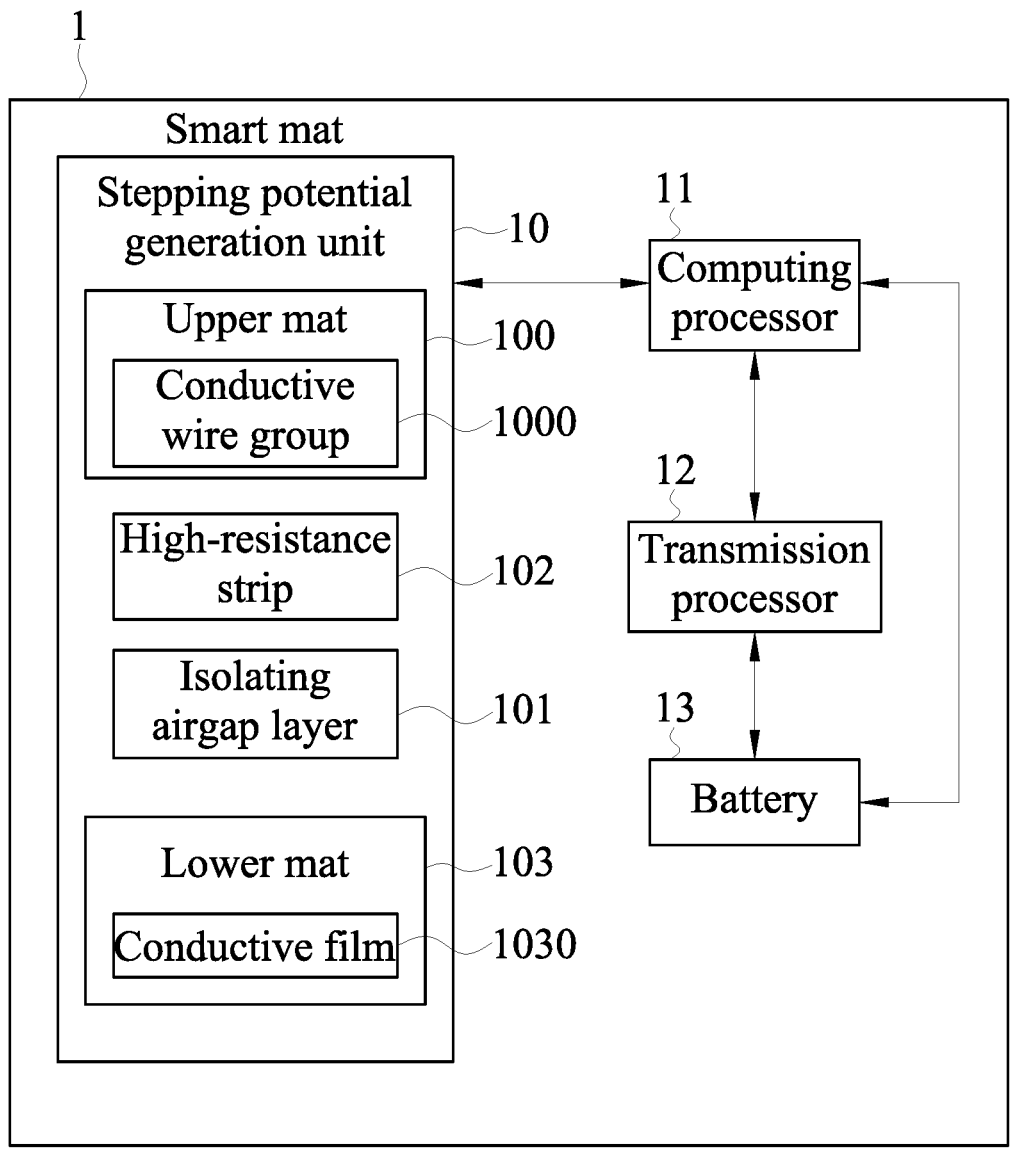
FIG. 1 is a block diagram of a first preferred embodiment of this invention.
Figure 2:
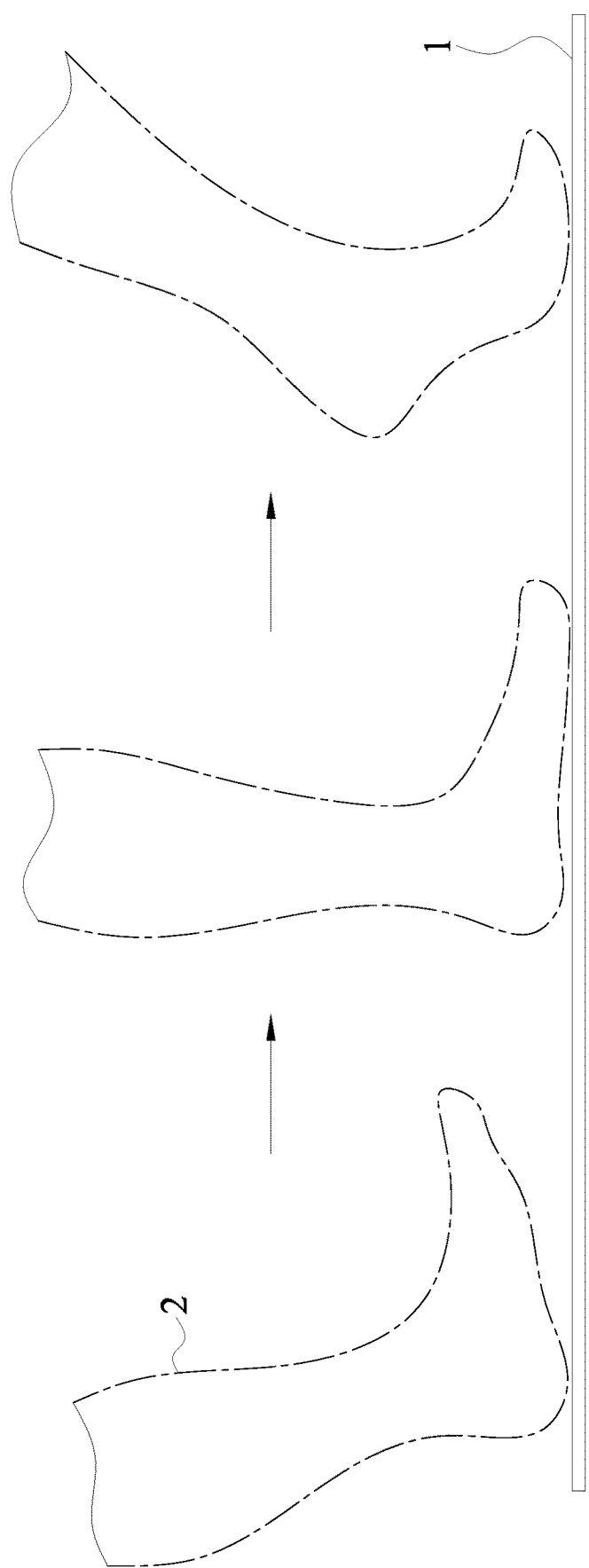
FIG. 2 is a schematic view showing a continuous change of stepping position of the first preferred embodiment of this invention.
Figure 3:
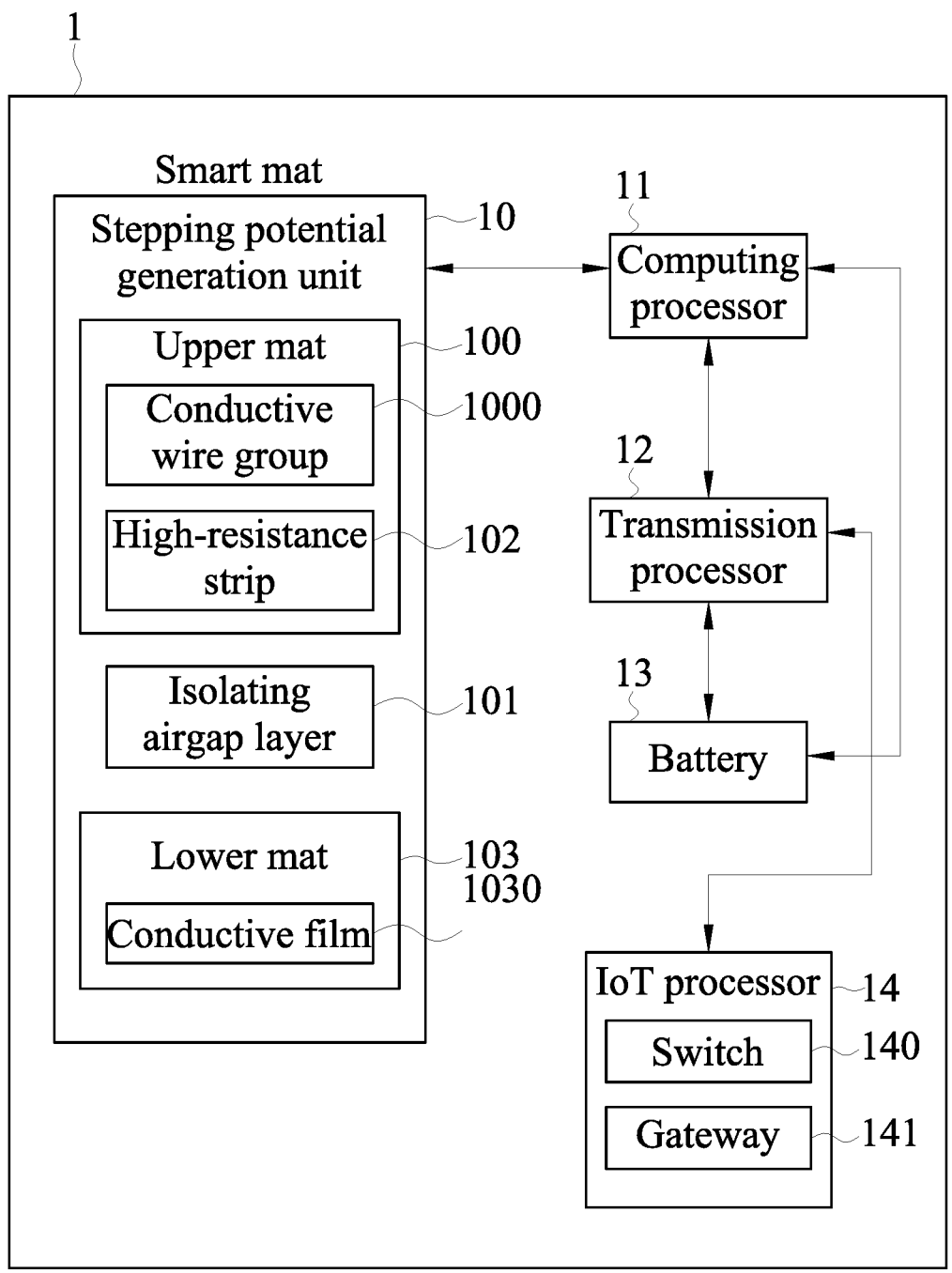
FIG. 3 is a block diagram of a second preferred embodiment of this invention.
Figure 4:
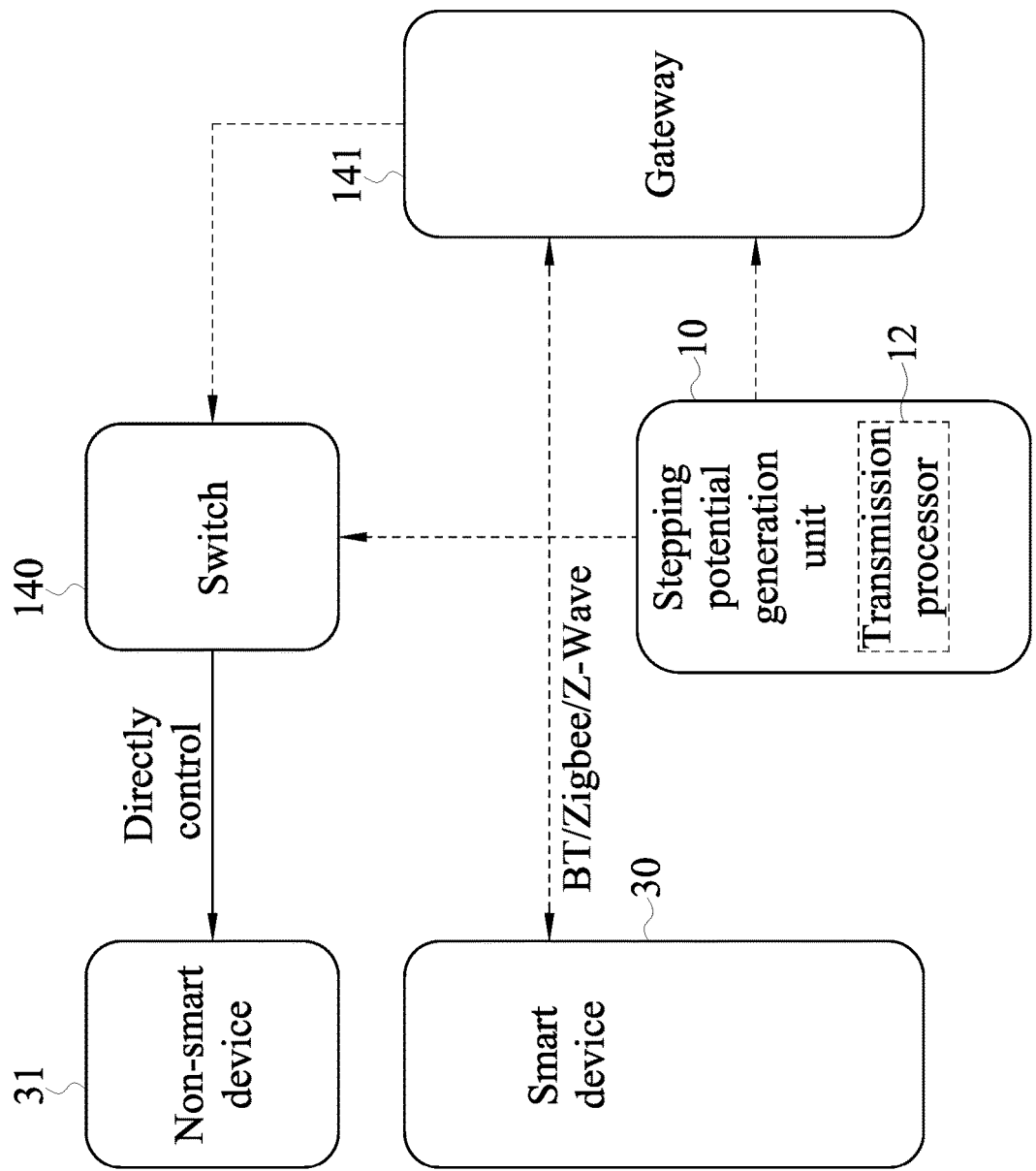
FIG. 4 is a schematic view showing the structure of the second preferred embodiment of this invention.
Figure 5:
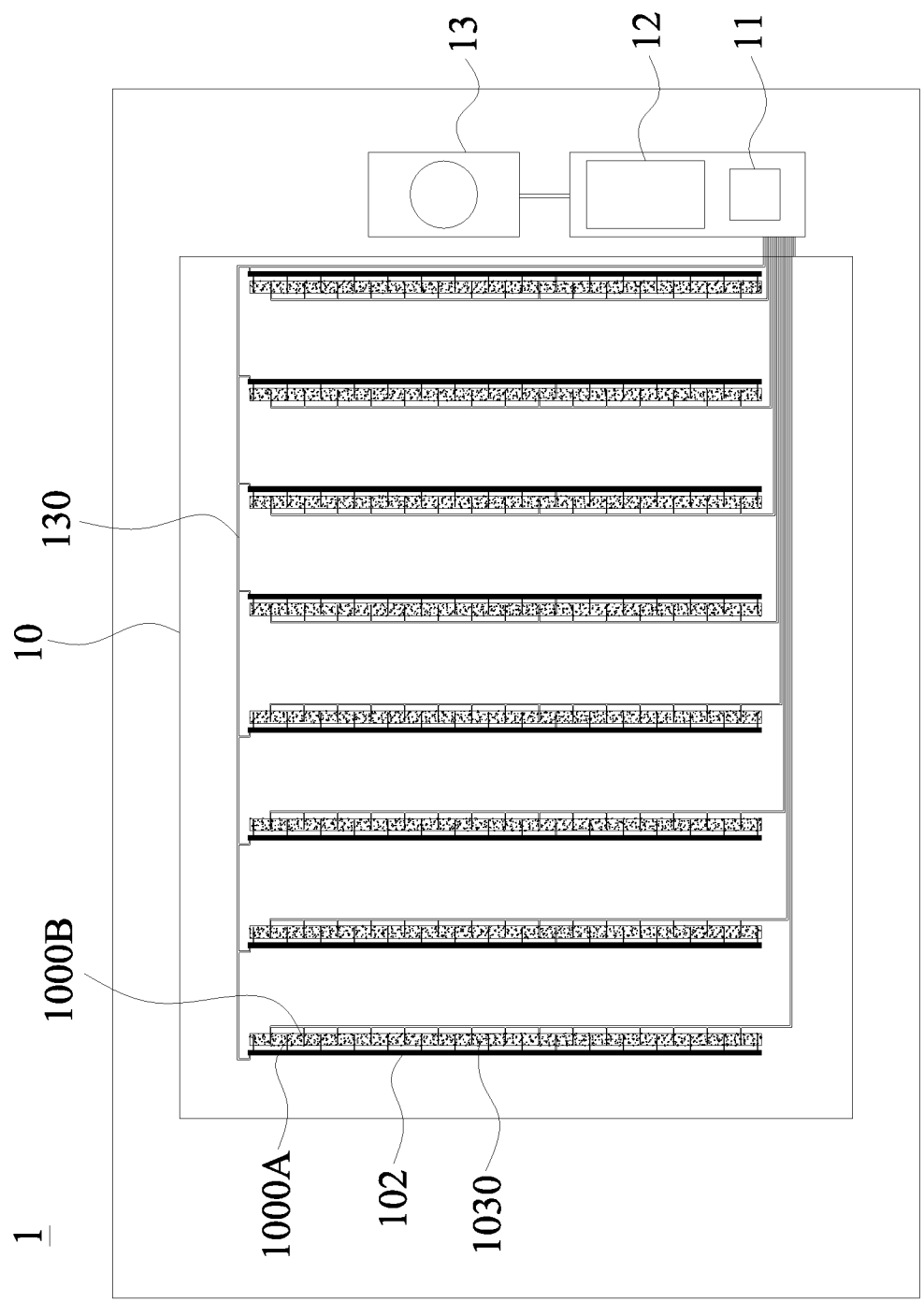
FIG. 5 is a schematic view of a smart mat of the second preferred embodiment of this invention.
Figure 6:
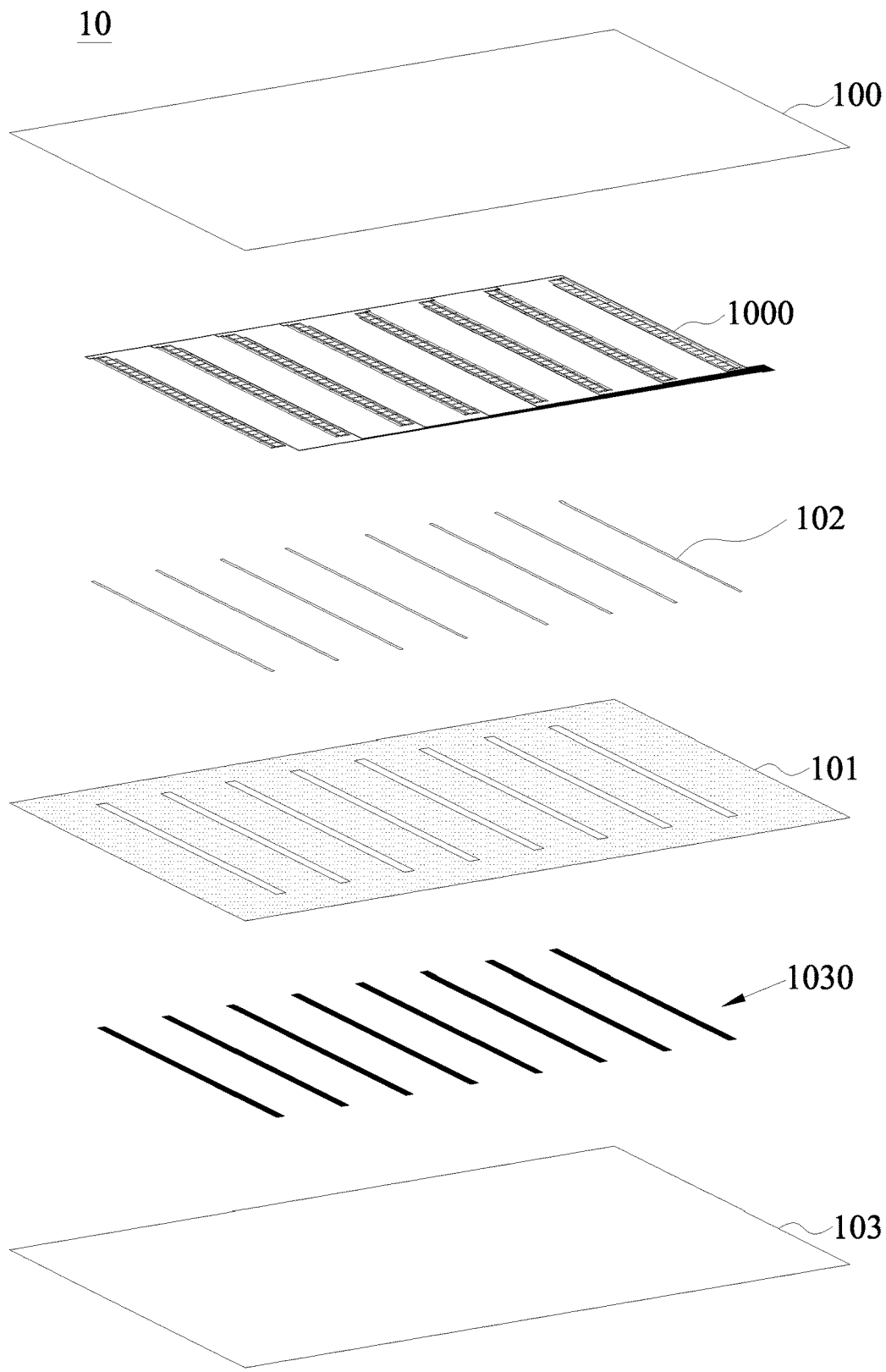
FIG. 6 is an exploded view of a stepping potential generation unit of the second preferred embodiment of this invention.

With reference to FIGS. 1 and 2 for the block diagram of a smart mart and the schematic view showing the stepping direction of the first preferred embodiment of the present invention respectively, the smart mat 1 comprises a stepping potential generation unit 10, a computing processor 11, a transmission processor 12 and a battery 13 for sensing the stepping direction of a stepper 2 to control the operation of a device inside/outside a building. The computing processor 11 is electrically coupled to the stepping potential generation unit 10, the transmission processor 12 and the battery 13. The stepping potential generation unit 10 comprises an upper mat 100, an isolating airgap layer 101, at least one high-resistance strip 102 and a lower mat 103, and the upper mat 100 is made of a polymer material and printed with a plurality of conductive wire groups 1000, and the lower mat 103 is made of a polymer material and printed with a plurality of conductive films 1030, and the high-resistance strip 102 is disposed between the upper mat 100 and the lower mat 103.

When the stepper 2 stands at one of the positions of the upper mat 100 to press a part of the stepping potential generation unit 10, a part of the stepping potential generation unit 10 is pressed by an open-circuit state to pass a part of the conductive wire group 1000 through the isolating airgap layer 101 and conduct a part of the conductive film 1030. When a part of the conductive wire group 1000 and a part of the conductive film 1030 are electrically contacted with the length of one of the high-resistance strips 102 (wherein the longer the electrical contact length of the high-resistance strip 102, the larger the resistance and the smaller the potential) to generate a transition signal and a potential signal. In a general walking posture, the heel touches the ground first before the whole foot lands on the ground, and then the heel lifts up and only the front of the sole remains on the ground. Therefore, the stepping position is changing continuously, and the distributed position of the potential and the time sequence of the potentials are also changing continuously. After the transition signal is provided to wake up the computing processor 11, the computing processor 11 will compute the distributed position of each potential and the time sequence of distributing each potential to obtain and analyze a potential stepping process distribution area, so as to obtain a stepping direction and transmit a computation result to the corresponding device through the transmission processor 12.

With reference to FIGS. 3 to 6 for the block diagram and schematic views of the second preferred embodiment of the present invention respectively, the smart mat 1 comprises a stepping potential generation unit 10, a computing processor 11, a transmission processor 12, a battery 13 and a IoT processor 14 for sensing the stepping direction of a stepper to control the operation of a device 3 such as a door, a light, or an air purifier inside/outside a building or a switch of a smart device 30 or a non-smart device 31. The stepping potential generation unit 10 can be a plurality of film touch type potentiometers and comprises an upper mat 100, an isolating airgap layer 101, a plurality of high-resistance strips 102 and a lower mat 103, wherein the upper mat 100 is made of a polymer material such as silicone, rubber, foam or plastic and printed with a plurality of conductive wire groups 1000 and the high-resistance strips 102, and the lower mat 103 is also made of a polymer material and printed with a plurality of conductive films 1030, and the upper mat 100 and the lower mat 103 are printed, dried and placed on both sides of the isolating airgap layer 101, and finally stacked and glued integrally. In addition, the upper mat 100 is covered with a mat made of wool, fabric or an absorbent material. Similarly, a substrate made of a waterproof material or an anti-slip material is laid on the bottom of the lower mat 103 to make the smart mat 1 aesthetic while improving the comfortability and customized design. The stepping potential generation unit 10 is electrically coupled to the computing processor 11, and the computing processor 11 is electrically coupled to the transmission processor 12 and the battery 13, and the transmission processor 12 is electrically coupled to the battery 13 and the IoT processor 14. The IoT processor 14 comprises a switch 140 (which can be a smart switch) and a gateway 141, and the switch 141 is installed on the non-smart device 31. The transmission processor 12 is coupled to the switch 140 and the gateway 141 via a wireless signal of a low-power consuming Bluetooth, Thread, ZigBee or Z-Wave communication technology, and the gateway 141 is also coupled to the switch 140 and the smart device 30 via a wireless signal of the low-power consuming Bluetooth, Thread, ZigBee or Z-Wave communication technology.

Figure 7:
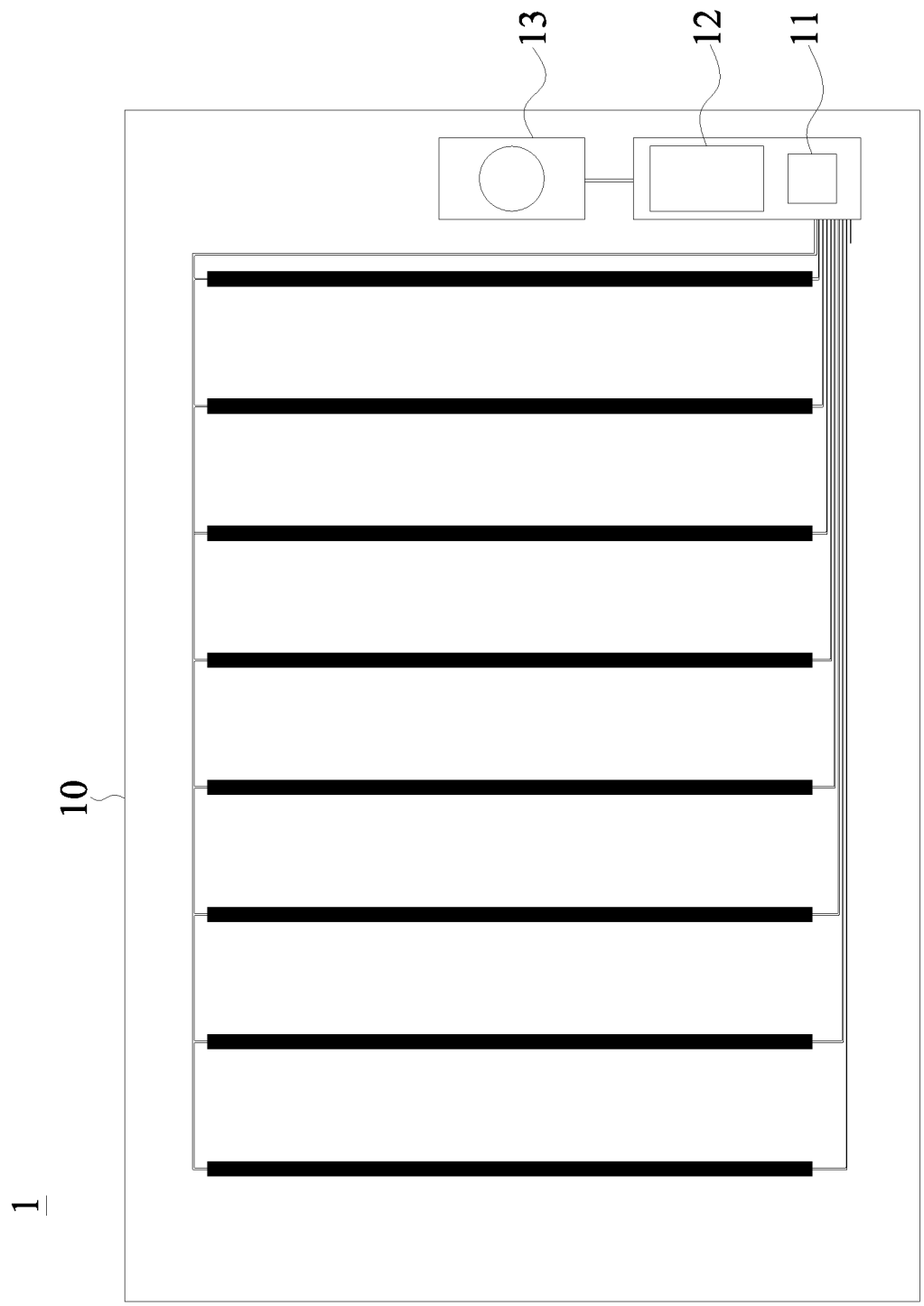
FIG. 7 is a schematic view of a smart mat of a third preferred embodiment of this invention.
Figure 8:
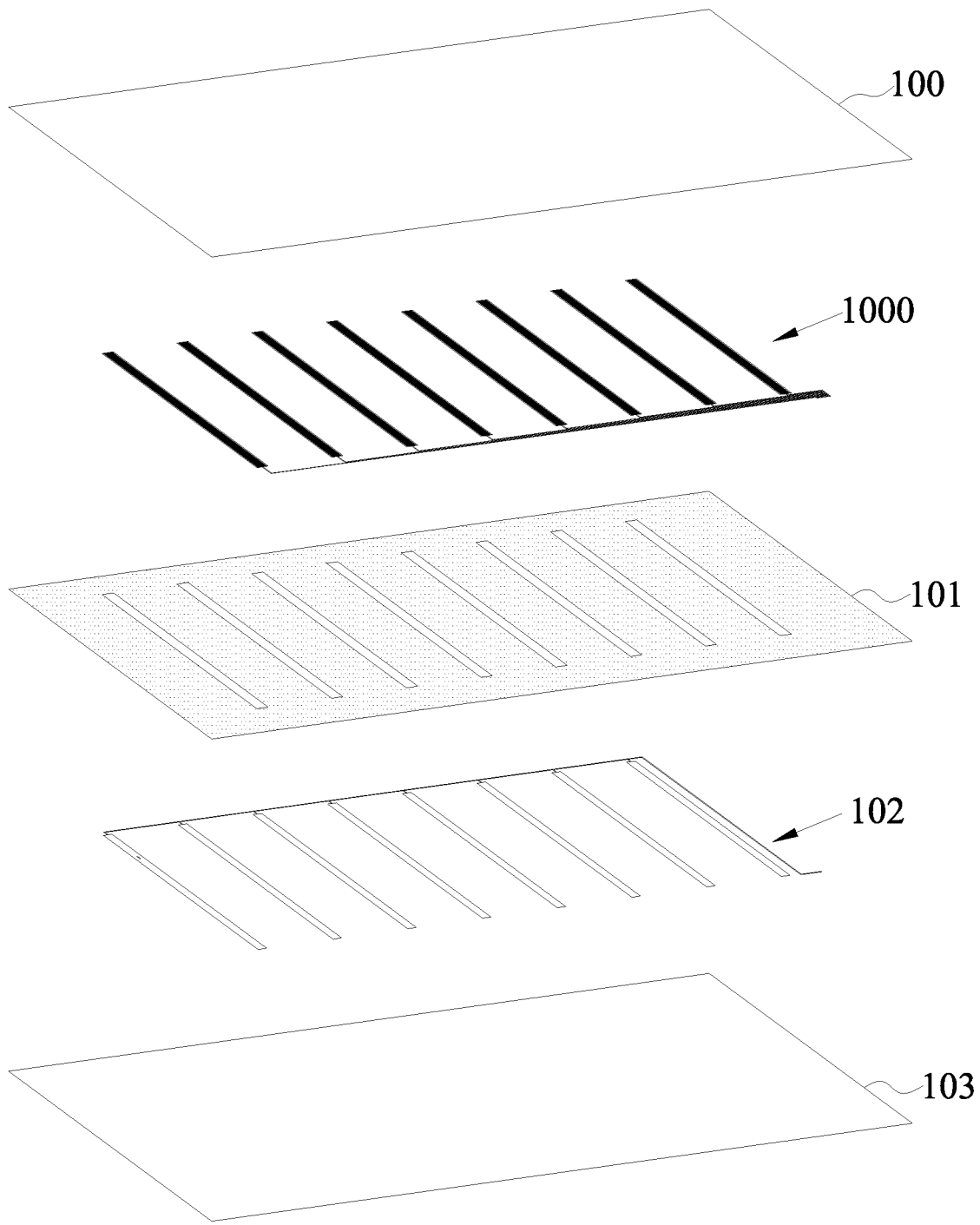
FIG. 8 is an exploded view of a stepping potential generation unit of the third preferred embodiment of this invention.

In the stepping potential generation unit 10, a first finger wire 1000A of each of the conductive wire groups 1000 has one end coupled to the respective high-resistance strip 102, and the other end spaced and staggered with a second finger wire 1000B of the respective conductive wire group 1000, and the finger wires 1000A, 1000B are suspended on the respective conductive film 1030 through the isolating airgap layer 101. Therefore, when the stepper stands at one of the positions of the smart mat to press a part of the stepping potential generation unit 10, a part of the stepping potential generation unit 10 is pressed by an open-circuit state to pass a part of the conductive wire group 1000 through the isolating airgap layer 101 and touch the conductive film 1030 for an electrical conduction. In other words, part of the first finger wires 1000A and part of the second finger wires 1000B are bent through the isolating airgap layer 101 to touch the conductive film 1030 for the electrical conduction. Now, current flows from a power line 130 through the high-resistance strips 102, the first finger wire 1100A, the conductive film 1030 and the second finger wire 1000B to the computing processor 11 to generate a potential. A part of the conductive wire group 1000 and a part of the conductive film 1030 are electrically contacted with the length of one of the high-resistance strips 102 to generate a transition signal and a potential signal, wherein the longer the electrical contact length of the high-resistance strip 102, the larger the resistance and the smaller the potential. The transition signal is used to wake up the computing processor 11, and the computing processor 11 computes the distributed position of each potential and the time sequence of distributing each potential to obtain and analyze a potential stepping process distribution area, so as to obtain a stepping direction and transmit a computation result to the corresponding device 3 through the transmission processor 12. It is noteworthy that the stepping potential generation unit 10 can be one as shown in FIGS. 7 and 8, and the high-resistance strips 102 is printed onto the lower mat 103 by screen printing.

And then, the transmission processor 12 transmits the computation result to the switch 140, so that the switch 140 drives the non-smart device 31 to be turned on or off, or the transmission processor 12 transmits the computation result to the gateway 141, so that the gateway 141 drives the smart device 30 to operate or drives the non-smart device 31 by the switch 140 to operate.

Figure 9:
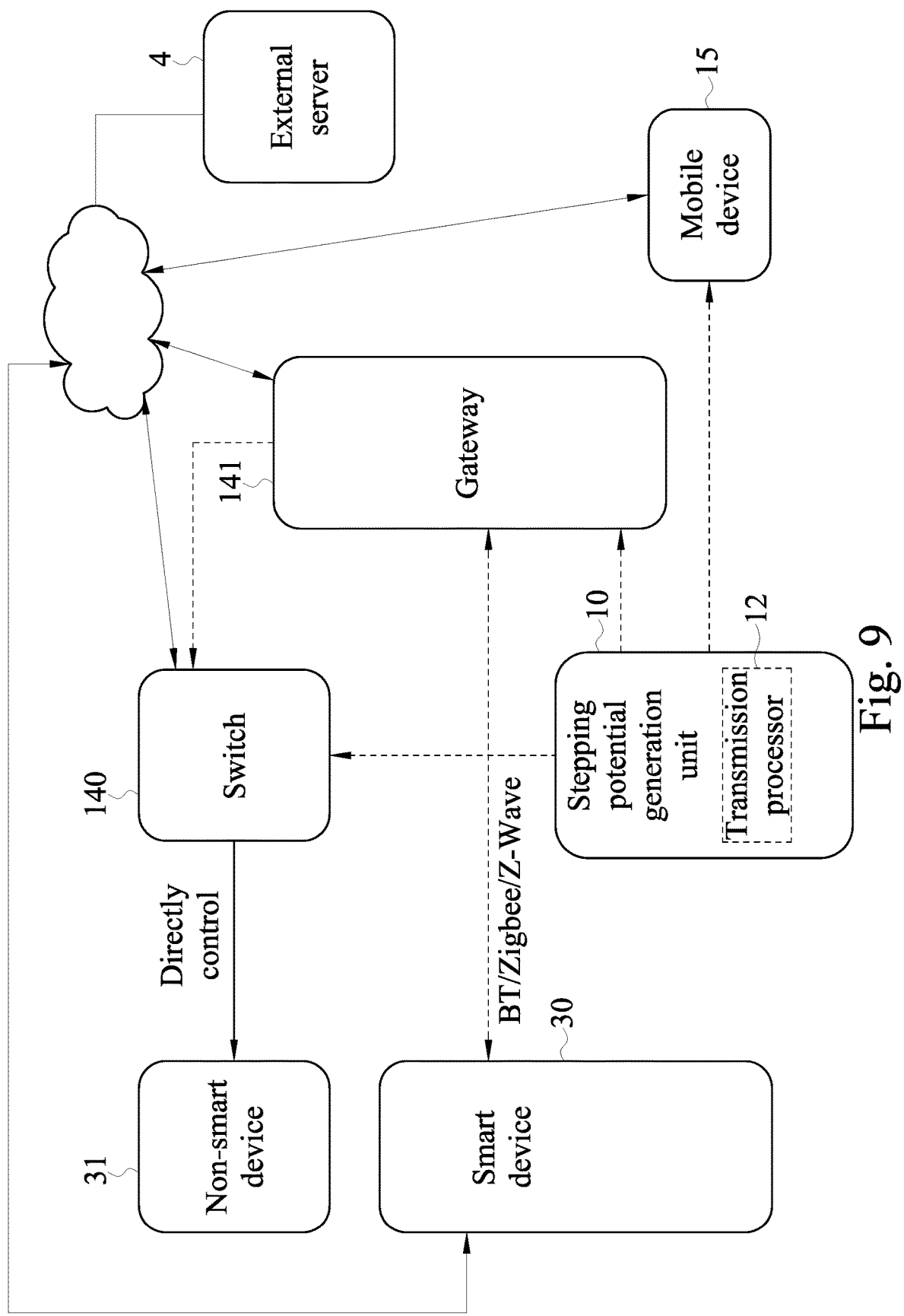
FIG. 9 is a schematic view showing the structure of a fourth preferred embodiment of this invention.
Figure 10:
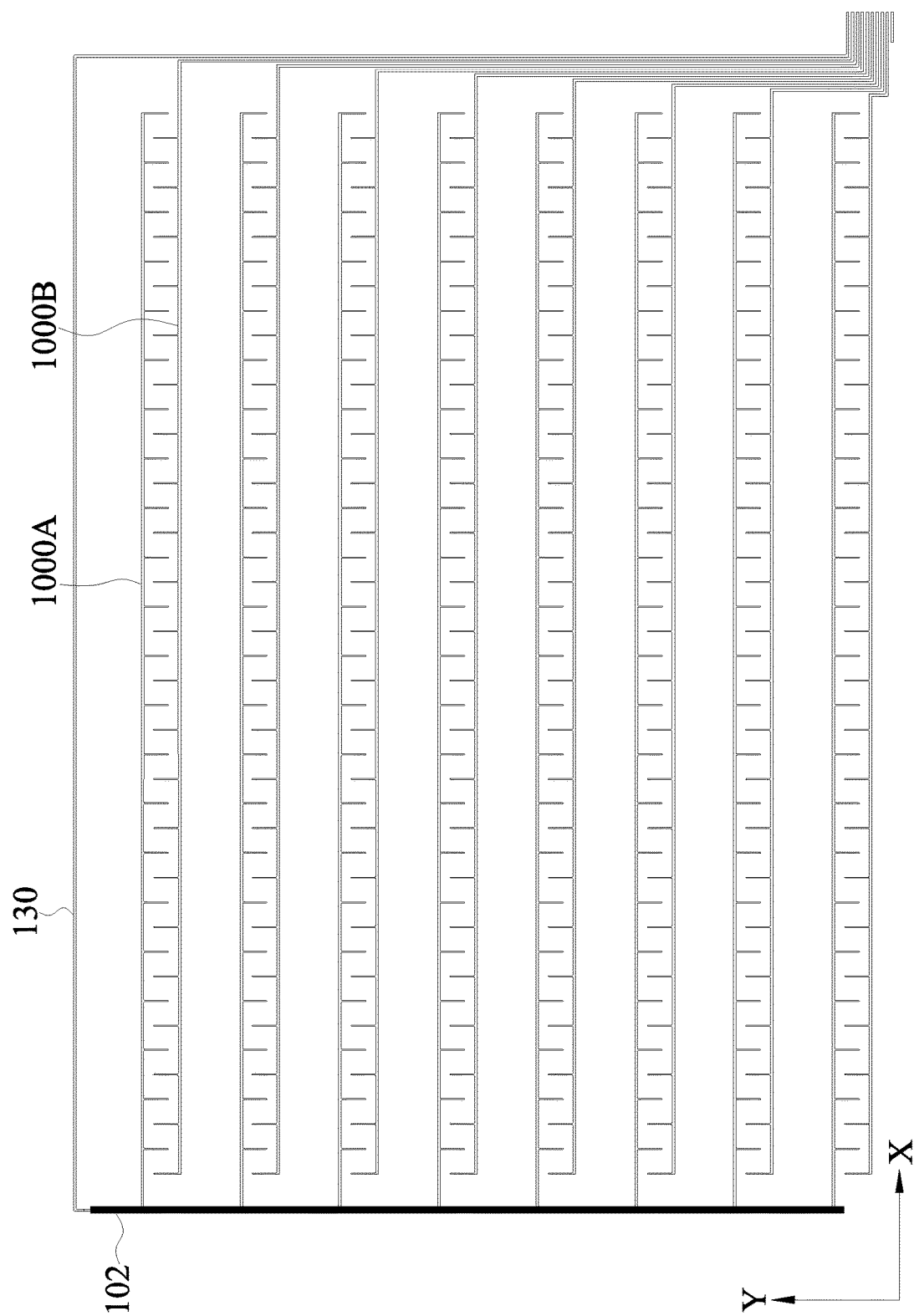
FIG. 10 is a schematic view of a smart mat of the fourth preferred embodiment of the present invention.
Figure 11:
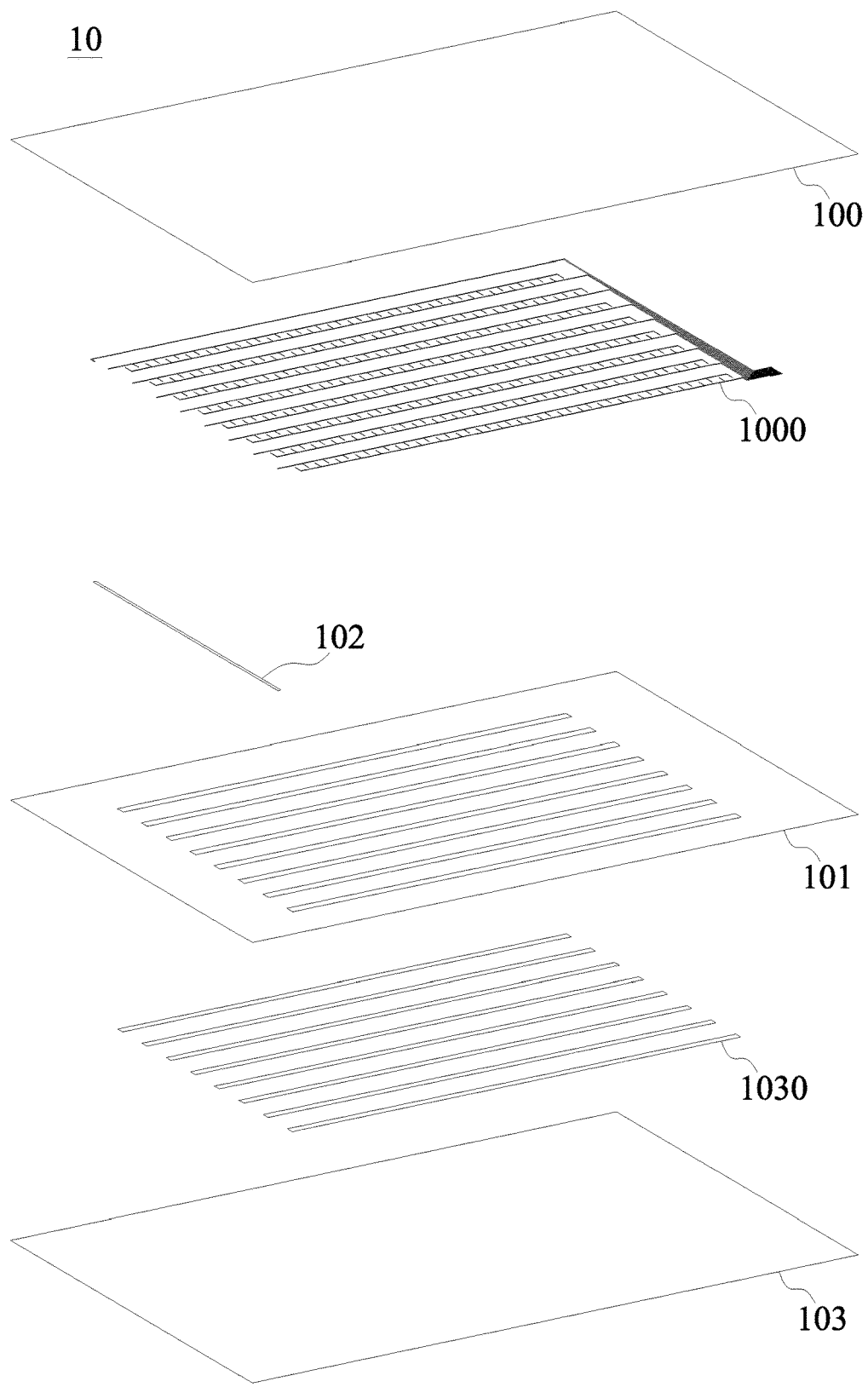
FIG. 11 is an exploded view of a stepping potential generation unit of the fourth preferred embodiment of this invention.

With reference to FIGS. 9 to 11 for another implementation mode, there is one high-resistance strip 102 printed on the upper mat 100, and the smart mat 1 further comprises a mobile device 15. The mobile device 15 can be a smartphone, a tablet PC or a notebook, etc., and the mobile device 15 is coupled to the transmission processor 12 via Bluetooth, Thread, ZigBee or Z-Wave wireless signal, and coupled to at least one of the switch 140, the gateway 141 and the smart device 30 via a wireless signal of the cloud network communication technology by using WiFi. Therefore, when the transmission processor 12 directly transmits the computation result to the mobile device 15 or transmits the computation result to the mobile device 15 through the gateway 141, the mobile device 15 can drive the switch 140, the gateway 141 or the device 3 via the cloud network to control the operation of the device 3.

Figure 12:
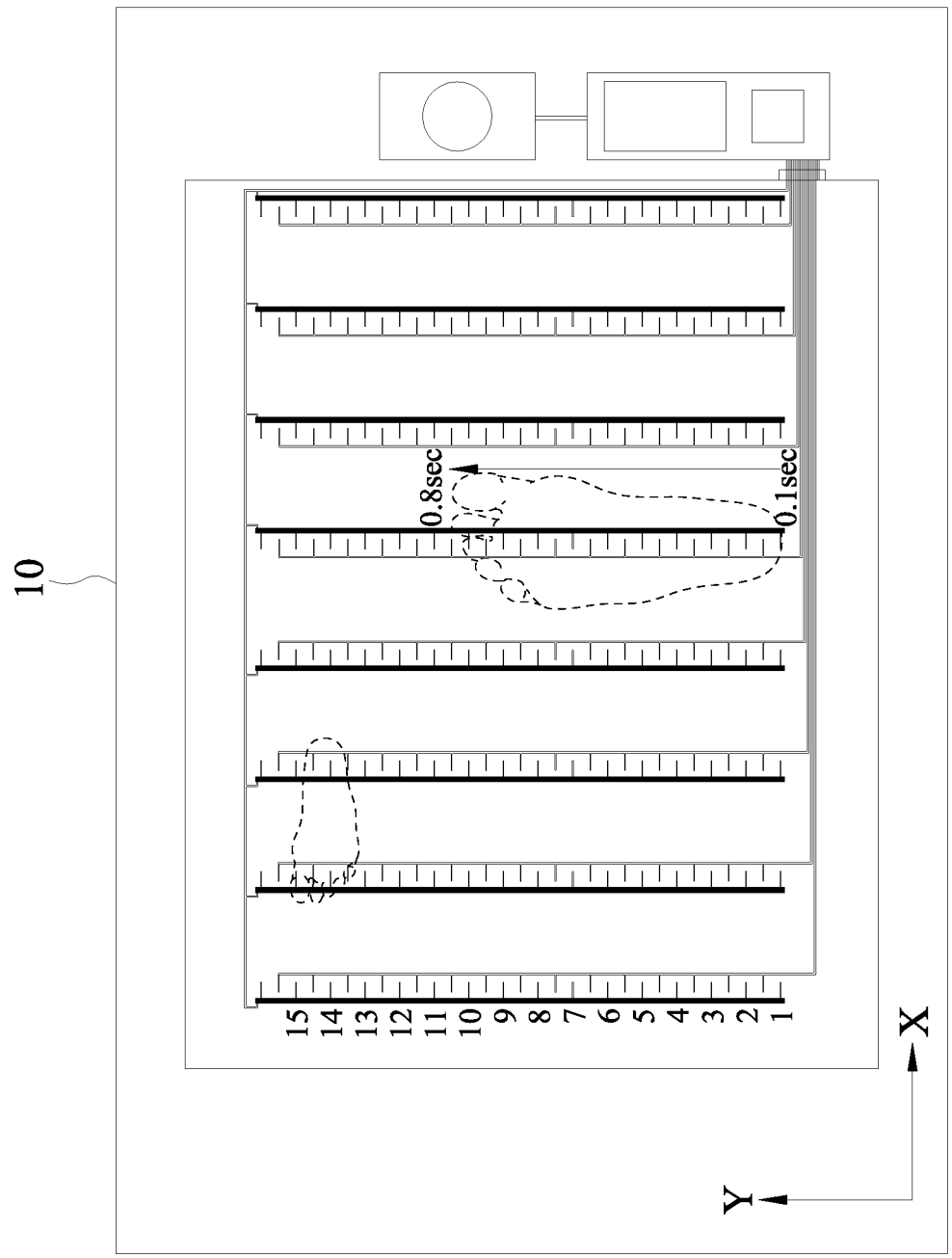
FIG. 12 is a schematic view showing a stepping experiment of a fifth preferred embodiment of the present invention.
Figure 13:
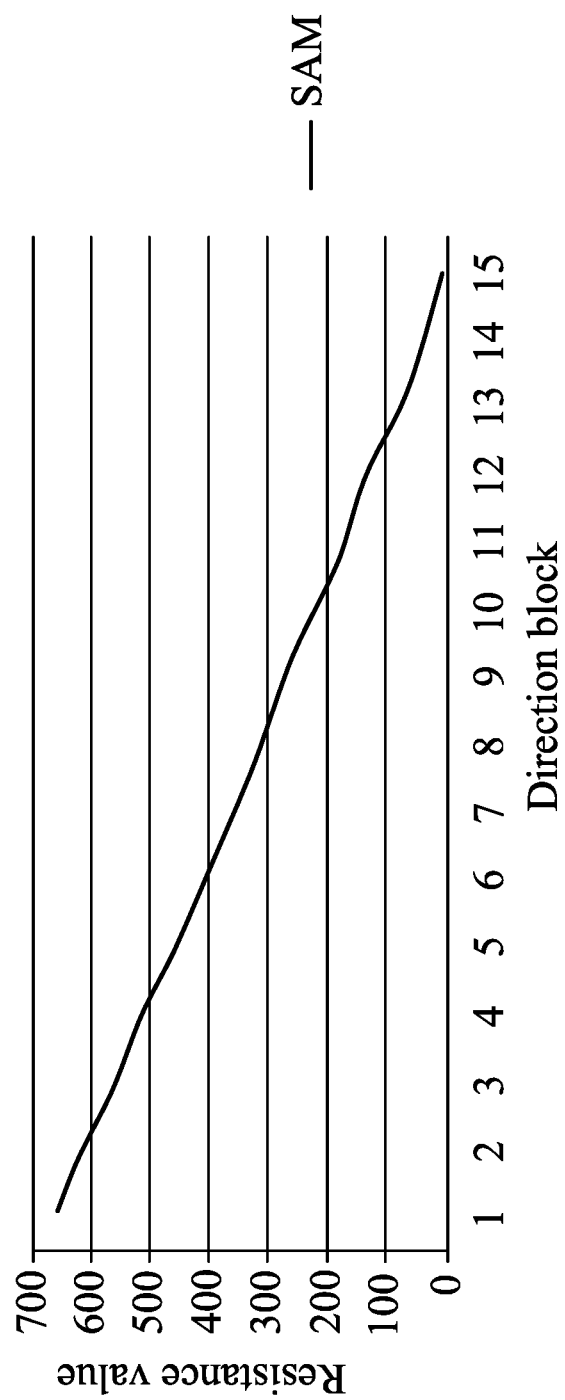
FIG. 13 is a chart of resistance value data collected in the stepping experiment in accordance with the fifth preferred embodiment of the present invention.
Figure 14:
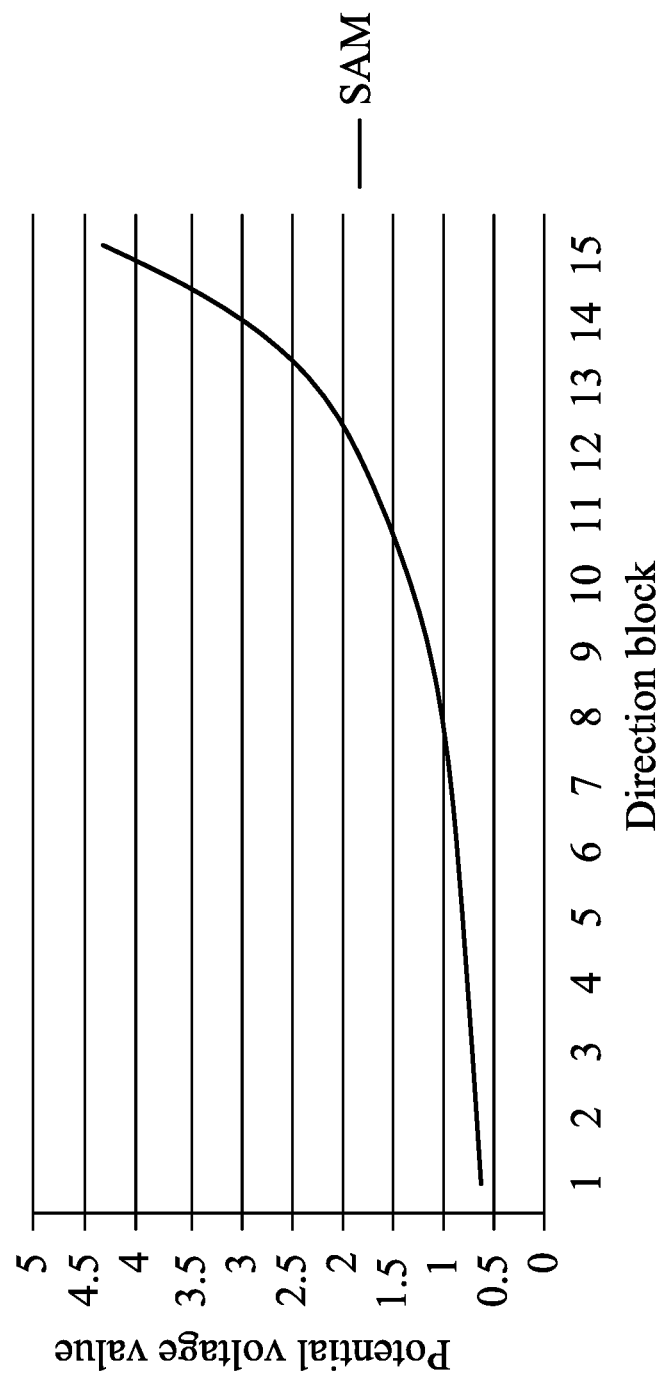
FIG. 14 is a chart of potential voltage value data collected in the stepping experiment in accordance with the fifth preferred embodiment of the present invention.

In addition, the smart mat 1 can be coupled to an external server 4 such as a cloud hard drive through the cloud network. In other words, at least one of the switch 140, the gateway 141, the mobile device 15 and the smart device 30 can be telecommunicatively coupled to the external server 4 for uploading the received data such as the stepping direction and the computation result to the external server 4 for storage and provided for analysing and obtaining the in-and-out time of the stepper and count the number of steppers, so as to provide a better smart life service. It is noteworthy that the computing processor 11 can compute the change of resistance of the stepping potential generation unit 10 in a time sequence, the analytical result of the stepping experiment as shown in FIG. 12 shows the stepping directions at least in X direction and Y direction. In the present invention, a power source of 5V (volts) is connected in series with a pull-down resistor of 100KΩ (kiloohm) for the experiment, and the potentiometer of the stepping potential generation unit 10 is divided into 15 blocks for the illustration. When the circular contact point of every 0.5 cm^2 (square centimeter) of the stepping potential generation unit 10 and a pressure of approximately 1 Kg is received, the measured resistance value (Ku) and potential voltage value (V) are shown in FIGS. 13 and 14. Obviously, the testing function of the present invention is not limited to a single the stepping direction only, but it can improve the practical applications and meet the diversified smart life requirements.

Figure 15:
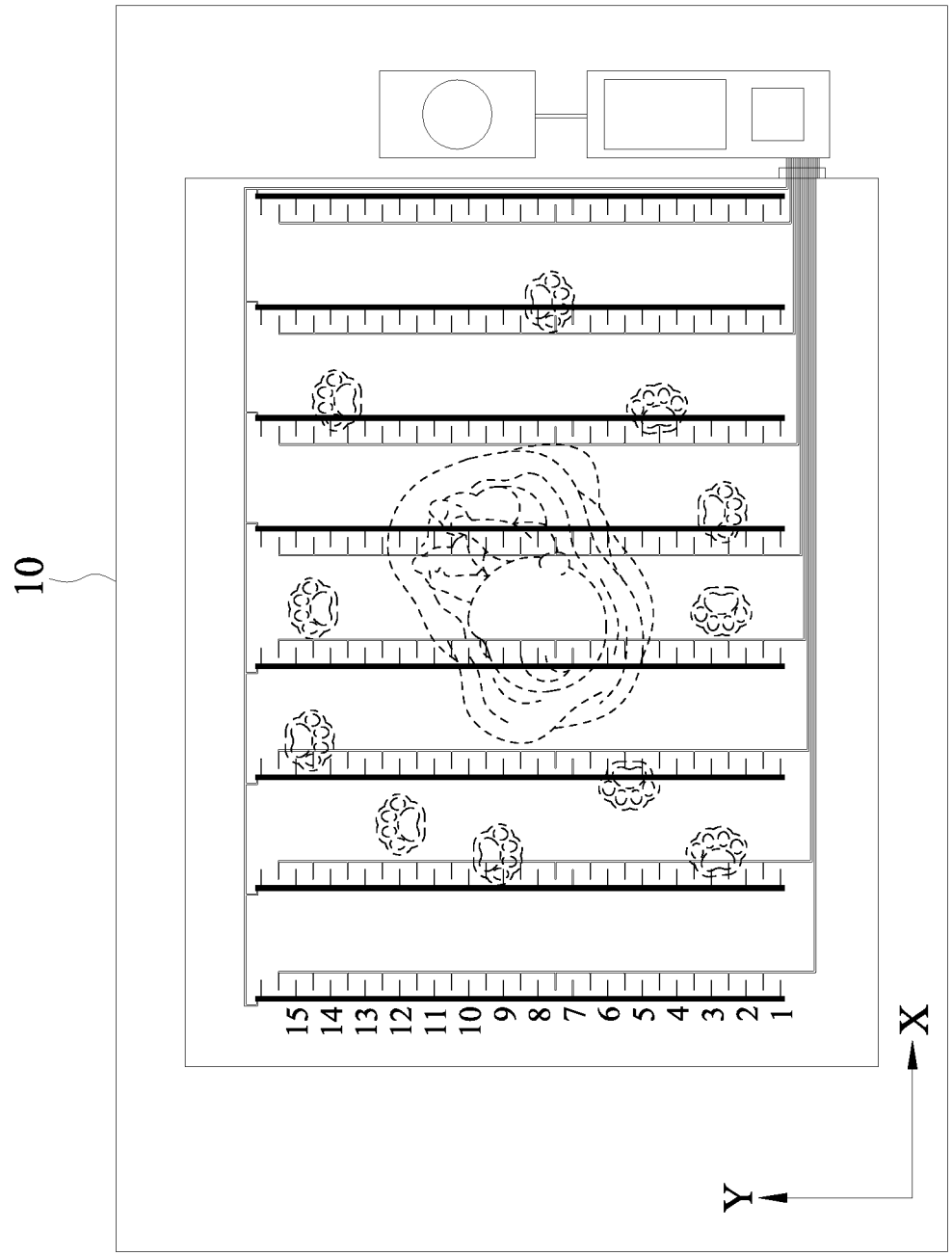
FIG. 15 is a schematic view of the stepping in accordance with a sixth preferred embodiment of the present invention.

In other words, the computing processor 11 is able to analyze the information of the potential such as multiple stepping or repeated stepping in the potential stepping process distribution area, and conclude that a small quantity of potentials are determined as at least one small-area livestock stepping, a middle quantity of potentials are determined as at least one middle-area child stepping, a large quantity of potentials are determined as at least one large-area adult stepping, and the largest quantity of potential area determined as at least one largest-area baby lying. In addition, the computing processor 11 uses the potential distribution to determine whether the potential stepping process distribution area shows a single area of stepping-lying or a multiple areas of stepping-lying to decide to send out an intermittent warning or a danger warning. In Table 1 and FIG. 15, if the computing processor 11 determines that the potential stepping process distribution area shows a single potential distribution area of stepping or lying, such as the single largest-area baby lying, the large-area adult stepping, the middle-area child stepping or the small-area livestock stepping, indicating that this situation exist alone without any danger, the computing processor 11 will not send out any warning. If the computing processor 11 determines that the potential stepping process distribution area shows a multiple potential distribution area of stepping or lying in the large-area adult stepping, such as the large-area adult stepping together with at least one of the largest-area baby lying, the middle-area child stepping and the small-area livestock stepping, indicating that there is an adult at site and has no danger, then the computing processor 11 will not send out any warning. If the computing processor 11 determines that the potential stepping process distribution area shows the middle-area child stepping and the small-area livestock stepping, and both stepping are near to each other, indicating that the child has no immediate danger, the computing processor 11 will not send out any warning. If the computing processor 11 determines that the potential stepping process distribution area shows the middle-area child stepping and the small-area livestock stepping and the small-area livestock stepping surrounds the middle-area child stepping, indicating that the child has danger, the computing processor 11 will send out an intermittent warning. If the computing processor 11 determines that the potential stepping process distribution area shows the middle-area child stepping and the small-area livestock stepping, and the small-area livestock stepping densely surrounds the middle-area child stepping, indicating that the child is facing danger, the computing processor 11 will send out a danger warning with frequent sounds. If the computing processor 11 determines that the potential stepping process distribution area shows the largest-area baby lying and the small-area livestock stepping, and both are near one another, indicating that the baby has danger, the computing processor 11 will send out the intermittent warning. If the computing processor 11 determines that the potential stepping process distribution area shows the largest-area baby lying and the small-area livestock stepping, and the small-area livestock stepping surrounds the largest-area baby lying, indicating that the baby is facing danger, the computing processor 11 will send out the danger warning with frequent sounds. If the computing processor 11 determines that the potential stepping process distribution area shows the largest-area baby lying and the small-area livestock stepping, and the small-area livestock stepping densely surrounds the largest-area baby lying, indicating that the baby is facing extreme danger, the computing processor 11 will send out the danger warning continuously to provide an extreme danger signal.

TABLE 1

| Type of Area of Stepping | | | | Type of Warning | |
|---|---|---|---|---|---|
| Baby | Adult | Child | Livestock | Intermittent Warning | Danger Warning |
| • | | | | | |
| | • | | | | |
| | | • | | | |
| • | • | | | | |
| • | | • | | | |
| | | • | Near Surrounding | V | |
| | | • | Densely Surrounding | | V |
| • | | | Near Surrounding | V | |
| • | | | Densely Surrounding | | V VV |

What is claimed is:

1. A smart mat, for sensing a stepping direction of a stepper to control operation of a device, characterized in that the smart mat comprises a stepping potential generation unit, a computing processor, a transmission processor and a battery, and the computing processor is electrically coupled to the stepping potential generation unit, the transmission processor and the battery, and the stepping potential generation unit comprises an upper mat, an isolating airgap layer, a lower mat and at least one high-resistance strip, and the upper mat is made of polymer material and printed with a plurality of conductive wire groups, and the lower mat is made of polymer material and printed with a plurality of conductive films, and the high-resistance strip is disposed between the upper mat and the lower mat, so that when the stepper is standing at one of the positions of the upper mat to press a part of the stepping potential generation unit, and the part of the stepping potential generation unit in an open-circuit state is pressed to drive part of the conductive wire groups to pass through the isolating airgap layer and then touch the conductive films for an electrical conduction, and part of the conductive wire groups and part of the conductive films are electrically contacted with the high-resistance strip to an extent of a length, wherein the longer the electrical contact length of the high-resistance strip, the larger the resistance and the smaller the resistance, so as to generate a transition signal and a potential signal, and the transition signal is used to wake up the computing processor, and the computing processor computes distributed position of each potential and time sequence of distributing each potential to obtain a potential stepping process distribution area, so as to obtain and analyze a stepping direction, and sends a computation result the corresponding device through the transmission processor.

2. The smart mat according to claim 1, further comprising an IoT processor, having a switch and telecommunicatively coupled to the transmission processor, and the switch being installed onto the device and provided for receiving the computation result to drive the device to perform an opening or shutting operation.

3. The smart mat according to claim 2, wherein the IoT processor comprises a gateway coupled to the transmission processor and the switch via wireless signal, and when the transmission processor transmits the computation result to the gateway, the gateway controls the operation of the device through the switch.

4. The smart mat according to claim 3, further comprising a mobile device coupled to at least one of the transmission processor, the switch and the gateway via wireless signal.

5. The smart mat according to claim 4, the transmission processor is coupled to at least one of the switch, the gateway and the mobile device via wireless signal by a low-power consuming Bluetooth, Thread, ZigBee or Z-Wave communication technology.

6. The smart mat according to claim 5, the mobile device is coupled to at least one of the switch, the gateway and the device via wireless signal by a wireless compatible certified communication technology, and when the transmission processor transmits the computation result to the mobile device, the mobile device controls the switch, the gateway or the device through the wireless compatible certified communication technology.

7. The smart mat according to claim 6, wherein at least one of the switch, the gateway and the mobile device is telecommunicatively coupled to an external server for uploading the stepping direction and the computation result to the external server for storage and usage to analyse and obtain the in-and-out time of the stepper and calculate the number of steppers.

8. The smart mat according to claim 1, wherein the upper mat and the lower mat are made of a polymer material selected from the group consisting of silicone, rubber, foam and plastic; and/or the upper mat is covered with a mat made of wool, fabric or an absorbent material; and/or the lower mat has a substrate made of a waterproof material or an anti-slip material and laid thereunder.

9. The smart mat according to claim 8, wherein the upper mat and the lower mat are disposed on both sides of the isolating airgap layer and integrally glued with each other.

10. The smart mat according to claim 9, wherein the high-resistance strip comes with a plural quantity and the high-resistance strips are printed on the upper mat or the lower mat.

11. The smart mat according to claim 9, wherein the high-resistance strip comes with a singular quantity and the high-resistance strip is printed on the upper mat.

12. The smart mat according to claim 1, wherein the computing processor analyses the potential stepping process distribution area to know that there is a small quantity of potentials determined as at least one small-area livestock stepping, a middle quantity of potentials determined as at least one middle-area child stepping, a large quantity of potential determined as at least one large-area adult stepping, and the largest quantity of potentials determined as at least one largest-area baby lying; the potential stepping process distribution area shows one of different modes including an area of the stepping or lying with a single potential distribution, an area of the stepping or lying of the large-area adult stepping with a plural quantity of potential distributions, and adjacent areas of the middle-area child stepping and the small-area livestock stepping, or the small-area livestock stepping surrounding the middle-area child stepping, and if the computing processor determines that the small-area livestock stepping surrounds the middle-area child stepping or the largest-area baby lying, an intermittent warning will be sent, and if the computing processor determines that the small-area livestock stepping surrounds the largest-area baby lying or the time sequence of the small-number potential distribution of the small-area livestock stepping densely surrounds the middle-area child stepping, a danger warning will be sent; and if the computing processor determines that the time sequence of the small-number potential distribution of the small-area livestock stepping densely surrounds the largest-area baby stepping, an extreme danger warning will be sent.

* * * * *